United States Patent [19]
Hanson et al.

[11] Patent Number: 5,275,011
[45] Date of Patent: Jan. 4, 1994

[54] METHOD OF OPERATING A REFRIGERATION SYSTEM

[75] Inventors: Jay L. Hanson, Bloomington; Donald G. Knauff, Lakeville; Gerald J. Ladendorf, Bloomington, all of Minn.

[73] Assignee: Thermo King Corporation, Minneapolis, Minn.

[21] Appl. No.: 991,804

[22] Filed: Dec. 16, 1992

[51] Int. Cl.$^5$ ............................................. F23N 5/20
[52] U.S. Cl. ..................................... 62/157; 62/217; 62/229; 62/323.1; 236/46 R; 236/91 R; 123/179.4
[58] Field of Search ...... 236/47, 46; 236/91R; 236/91D; 236/91E; 62/133, 62/157, 231, 158, 229, 228.1, 217, 323.1; 123/179.3, 179.4

[56] References Cited

U.S. PATENT DOCUMENTS

| | | | |
|---|---|---|---|
| 3,964,676 | 6/1976 | Rooks et al. | 236/47 X |
| 3,979,059 | 9/1976 | Davis et al. | 236/46 R |
| 4,102,495 | 7/1978 | Flynn et al. | 236/46 R |
| 4,419,866 | 12/1983 | Howland | 62/228.4 |
| 4,421,075 | 12/1983 | Mandel | 123/142.5 R |
| 4,878,465 | 11/1989 | Hanson et al. | 123/179 BG |
| 4,911,358 | 3/1990 | Mehta | 236/46 R |
| 5,072,703 | 12/1991 | Sutton | 123/179.4 |

*Primary Examiner*—Harry B. Tanner
*Attorney, Agent, or Firm*—M. J. Moran

[57] ABSTRACT

A method of operating a refrigeration system having a compressor driven by an engine, with the refrigeration system being operable in a first control mode to hold the temperature of a conditioned space at a selected set point temperature, and in a second control mode to maintain the engine in a ready-to-start condition. The second control mode includes monitoring the ambient temperature, and determining a dynamic set point temperature as a function of ambient temperature. The engine is started and stopped to maintain engine startability, and also as a function of the dynamic set point temperature, to maintain the temperature of the conditioned space at the dynamic set point temperature while maintaining the engine in a ready-to-start condition. Control is changed from the second to the first control mode, when a programmed start feature is activated, with the time of such mode change being a function of the difference between the ambient temperature and the selected set point temperature.

10 Claims, 4 Drawing Sheets

METHOD OF OPERATING A REFRIGERATION SYSTEM

TECHNICAL FIELD

The invention relates in general to refrigeration systems, and more specifically to methods of operating a refrigeration system in which a refrigerant compressor is driven by an internal combustion engine.

BACKGROUND ART

U.S. Pat. No. 4,421,075 teaches apparatus for maintaining a diesel engine at ready to start temperature, starting the engine responsive to the falling of the block temperature to a predetermined low value, and stopping the engine when the block temperature rises to a predetermined high value. U.S. Pat. Nos. 4,419,866 and 4,878,465, which are assigned to the same assignee as the present application, teach refrigeration systems in which an internal combustion engine drives a refrigerant compressor in a start-stop mode to maintain the temperature of a conditioned space within a predetermined temperature range or null band adjacent to a selected set point temperature. The latter patents also teach automatic starting of the engine when the temperature of the conditioned space is satisfied, i.e., in the null temperature band, such as in response to low engine temperature, low battery voltage, the need to defrost, and the like. Such engine starts will be accompanied by operating the associated refrigeration system in cooling and heating cycles, as required, to hold the temperature of the served space in the null band.

SUMMARY OF THE INVENTION

Briefly, the invention includes a method of operating a refrigeration system having a compressor driven by an internal combustion engine which maintains the engine in a ready-to-start condition, while conserving fuel. The refrigeration system is operable in a selected one of at least first and second control modes. The first control mode may be the same as the prior art mode referred to in the Background Art, holding the temperature of a conditioned space in a predetermined temperature range adjacent to a selected set point temperature. The second control mode is a fuel saving mode which overrides the selection of a set point temperature. The second control mode includes the steps of monitoring the ambient temperature, and determining a dynamic set point temperature, to which the temperature of the conditioned space is maintained, with the dynamic set point temperature being a direct function of ambient temperature at any instant. The dynamic set point temperature thus changes with changes in ambient temperature. The engine is started and stopped to maintain the engine in a ready-to-start condition, such as by monitoring the temperature of the engine, and comparing the temperature with first and second reference values, and also as a function of the dynamic set point temperature. Thus, in the second control mode the engine is maintained in a ready-to-start condition, and the temperature of the conditioned space is maintained in a predetermined temperature range adjacent to the dynamic set point temperature, i.e., close to ambient temperature.

In a preferred embodiment of the invention, the second control mode further includes the step of providing a selectable programmed start mode wherein the conditioned space is to be at a selected set point temperature at a selected time of a selected day. The programmed start mode includes the steps of determining a dynamic period of time required to bring the temperature of the conditioned space to the selected set point temperature at the selected time of day as a function of the difference between the ambient temperature and the selected set point temperature. The second control mode further includes the step of switching from the second control mode to the first control mode, prior to the selected time of day, as a function of the determined dynamic period of time.

BRIEF DESCRIPTION OF THE DRAWINGS

The invention will become more apparent by reading the following detailed description in conjunction with the drawings, which are shown by way of example only, wherein.

DESCRIPTION OF PREFERRED EMBODIMENTS

Figure 1:
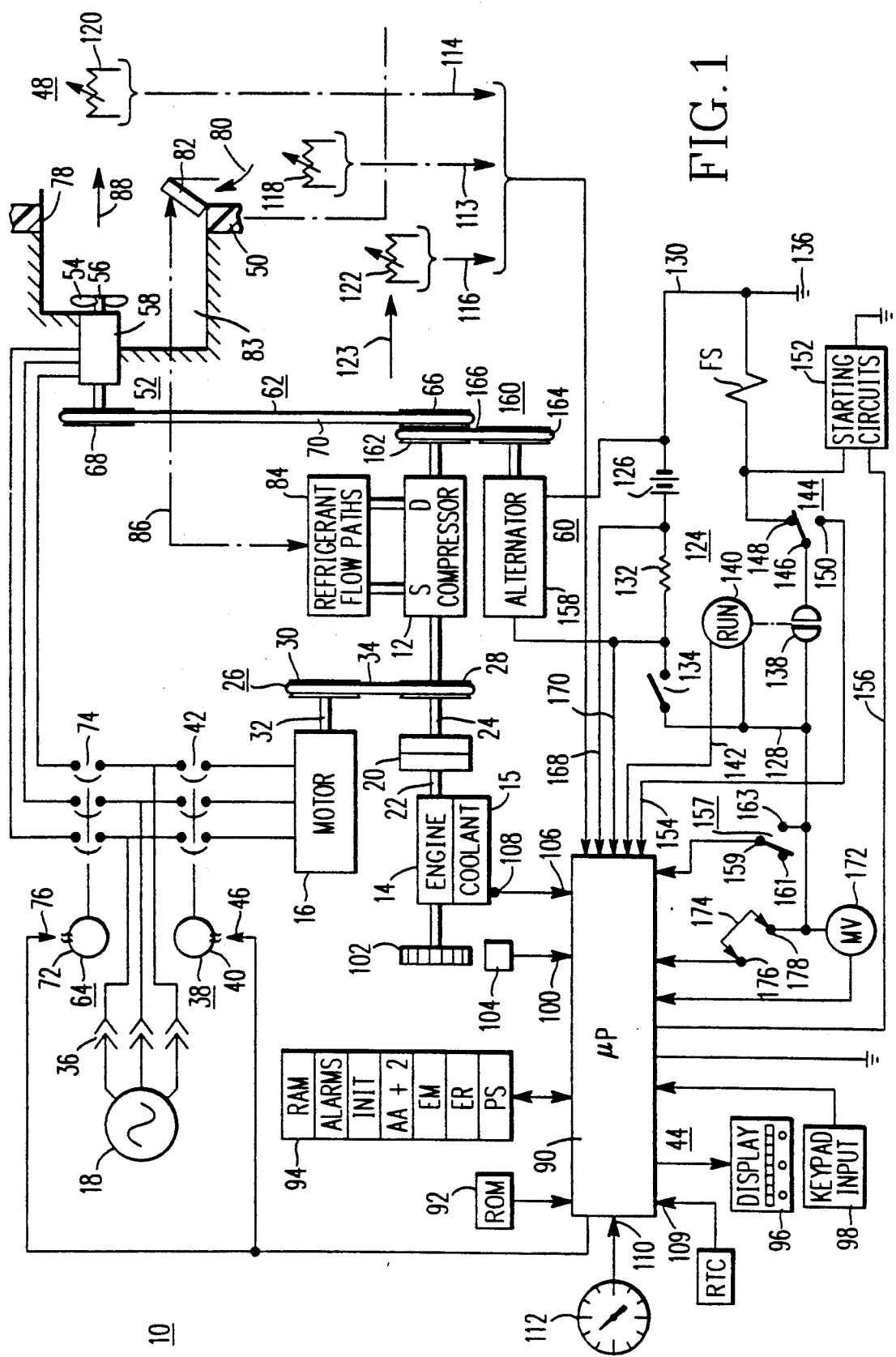
FIG. 1 is partially schematic and partially block diagram of a refrigeration system which may be operated according to the methods of the invention.

Referring now to the drawings, and to FIG. 1 in particular, there is shown a refrigeration system or unit 10 which may be operated in accordance with the methods of the invention. Refrigeration unit 10, which is preferably a transport refrigeration unit associated with a straight truck, a trailer, a container, and the like, includes a refrigerant compressor 12 driven by an internal combustion engine 14, gasoline or diesel, which may include an engine coolant 15. Compressor 12 may also be arranged to be driven by an electric motor 16 when refrigeration system 10 is at a terminal, or other stationary location where an AC source 18 is available. The specific arrangement utilized for the selective operation of the two prime movers 14 and 16 is not a part of the invention, with an exemplary arrangement being illustrated. The exemplary arrangement includes a centrifugal or electric clutch 20 disposed between an output shaft 22 of engine 14 and an input shaft 24 of compressor 12. When engine 14 is shut down, it is disconnected from shaft 24 via clutch 20, and motor 16 may then be energized to drive compressor 12, such as via a belt and pulley arrangement 26. Arrangement 26 includes a pulley 28 fixed to compressor input shaft 24, a pulley 30 fixed to an output shaft 32 of motor 16, and a belt 34 which links pulleys 28 and 30. Motor 16 is selectively connectable to AC source 18 via a plug-in connector 36 and a contactor 38 having an electromagnetic coil 40 and associated electrical contacts 42. Electromagnetic coil 40 is controlled by refrigerant electrical control 44, as indicated by arrow 46. Thus, when engine 14 is shut down, and AC source 18 is available, refrigeration control 44 may energize contactor 38 to drive compressor 12 with drive motor 16.

Refrigeration system 10 is associated with a conditioned space 48 defined by an enclosure 50. Air mover means 52, which may include a fan or blower 54 driven by a shaft 56. Shaft 56 may be an output shaft of an electric motor 58, if desired. Electric motor 58 may be connectable to an electrical system 60 of refrigeration unit 10, and/or to AC source 18, with FIG. 1 illustrating fan 54 being driven by a pulley and belt arrangement 62 when compressor 12 is being driven, and via AC source 18 and an electrical contactor 64 when it is desired to have air flow in conditioned space 48 during a null cycle when compressor 12 is not being operated. Pulley and belt arrangement 62 includes a pulley 66 on compressor shaft 24, a pulley 68 on shaft 56, and a linking belt 70. Electrical contactor 64 includes an electromagnetic coil 72 and contacts 74, with coil 72 being controlled by refrigerant electrical control 44, as indicated by arrow 76.

Fan 54 draws return air from conditioned space 48, through an opening 78 in enclosure 50, with the return air being indicated by arrow 80. The return air 80 is drawn through an evaporator coil 82 and into a fan plenum 83, with evaporator coil 82 being connected to compressor 12 and conventional refrigerant flow paths 84, as indicated by broken line 86. Evaporator 82 conditions the return air 80, cooling it, or heating it, as required, and conditioned air is discharged from fan plenum 83 back into conditioned space 48, with the discharge or conditioned air being indicated by arrow 88.

Electrical control 44 for operating refrigeration unit 10 includes a controller or microprocessor 90 having a read-only-memory (ROM) 92 for storing application programs, to be hereinafter described in detail, a random-access-memory (RAM) 94 for storing program variables, and a display 96. A keypad input device 98 is connectable to controller 90, to input predetermined instructions and program values, as will be hereinafter explained.

Other inputs to controller 90 include a signal 100 responsive to the speed or revolutions-per-minute (RPM) of engine 14, such as provided by a toothed wheel 102 and a sensor 104; a signal 106 provided by an engine temperature sensor 108 which indicates, for example, engine block temperature, or engine temperature of the engine coolant 15; an input 109 from a real time clock RTC; an input 110 from a set point temperature selector 112, which temperature value may alternatively be input via the keypad input 98 device; and inputs 113, 114 and 116 from temperature sensors 118, 120 and 122, respectively. Temperature sensor 118 is responsive to the temperature RA of the return air 80, sensor 120 is responsive to the temperature DA of the discharge air 88, and sensor 122 is disposed outside enclosure 50, and is responsive to the temperature AA of the ambient air, indicated by arrow 123.

Controller 90 also receives inputs from an electrical control circuit 124. Electrical control circuit 124 includes a battery 126, which among other things is used to start engine 14. Battery 126 is connected between a pair of power supply conductors 128 and 130 via a shunt 132 and an on-off switch 134. Conductor 130 is connected to electrical ground 136. A relay RUN having a normally open contact 138 and an electromagnetic coil 140 is provided which must be energized in order for either engine 14 or motor 16 to be operative. Electromagnetic coil 140 of relay RUN is connected between conductor 128 and controller 90, with controller 90 providing sinking current for relay RUN via a conductor 142 when it is necessary to energize relay RUN and a selected one of the prime movers 14 or 16.

A prime mover selector switch 144 is provided which has an input terminal 146 connected to power supply conductor 128 via the normally open contact 138 of relay RUN. Input terminal 146 is selectively connectable to either one of first and second output terminals 148 and 150. When switch 144 is connected to output terminal 148 engine 14 is selected as the operative prime mover, and the step of energizing relay RUN provides a control voltage for engine starting circuits 152 and for an engine fuel solenoid FS. With relay RUN energized, the logic level of an input signal 154 from output terminal 150 indicates to controller 90 which prime mover has been selected. When input signal 154 is at a logic zero level, controller 90 controls the engine starting circuits 152, as indicated by control line 156, to control the operation of engine 14, and when input signal 154 is at a logic one level, controller 90 controls contactor 38 to control electric motor 16.

A selector switch 157 is provided to indicate to controller 90 whether continuous operation of the operative prime mover is desired, or a start-stop cycling mode. In continuous operation the operative prime mover is not stopped. For example, in continuous operation, unit 10, once set point is reached, may cycle back and forth between heating and cooling cycles to maintain the selected set point temperature. In a cycling start-stop mode, the prime mover is shut down when the temperature of the conditioned space 48 enters a "null" temperature band adjacent to the selected set point temperature, and it is started up again when the temperature of the conditioned space 48 moves outside this predetermined null temperature zone. Selector switch 157, for example, may have first, second and third terminals 159, 161 and 163, with terminal 159 being connected to controller 90. Terminal 161 is unconnected, and terminal 163 is connected to conductor 128. When terminals 159 and 161 are interconnected by switch 157, the logic zero level indicates continuous operation, and when terminals 159 and 163 are interconnected by switch 157, the logic one level indicates start-stop operation has been selected.

Rotation of compressor 12 is arranged to drive an alternator 158, such as via a pulley-belt arrangement 160 which includes a pulley 162 on compressor shaft 24, a pulley 164 on alternator 158, and a belt 166. The output of alternator 158 is connected across shunt 132 and battery 126, to provide charging current for battery 126 and voltage for power supply conductors 128 and 130. Conductors 168 and 170, connected across shunt 132, are connected to inputs of controller 90 to provide a voltage having a magnitude and polarity responsive to the magnitude and direction of current flow through shunt 132.

When refrigeration unit 10 has a suction line modulation valve MV connected in the refrigerant flow paths 84, it has a control coil 172 connected between conductor 128 and controller 90, with controller 90 controlling the magnitude of current flow to control the size of the refrigerant flow orifice in modulation valve MV. When modulation control is desired, its selection is indicated to controller 90 by connecting a jumper 174 between two spaced terminals 176 and 178, with terminal 176 being connected to provide an input signal 179 for controller 90, and terminal 178 being connected to conductor 128. Thus, selection of modulation control via jumper 174 provides a logic one input signal 179 to controller 90.

When refrigeration unit 10 is operating in a normal or first control mode, controller 90 develops a control error which includes the step of calculating a temperature difference ΔT between the temperature RA return air 80 and the set point temperature SP selected on set point temperature selector 112. The resulting control error is utilized with a control algorithm to determine when refrigeration unit 10 should be in cooling, heating, and null cycles. A null cycle is entered when refrigeration unit 10 is operating in a start-stop cycling mode and conditioned space 48 does not require a cooling cycle or a heating cycle to hold the temperature of conditioned space 48 in a predetermined "null" temperature band adjacent to the selected set point temperature. In the start-stop cycling mode the operative prime mover is shut down while the temperature of the conditioned space 48 is in the null band. U.S. Pat. No. 5,123,252, which is assigned to the same assignee as the present application, illustrates control algorithms which may be used.

Figure 2:
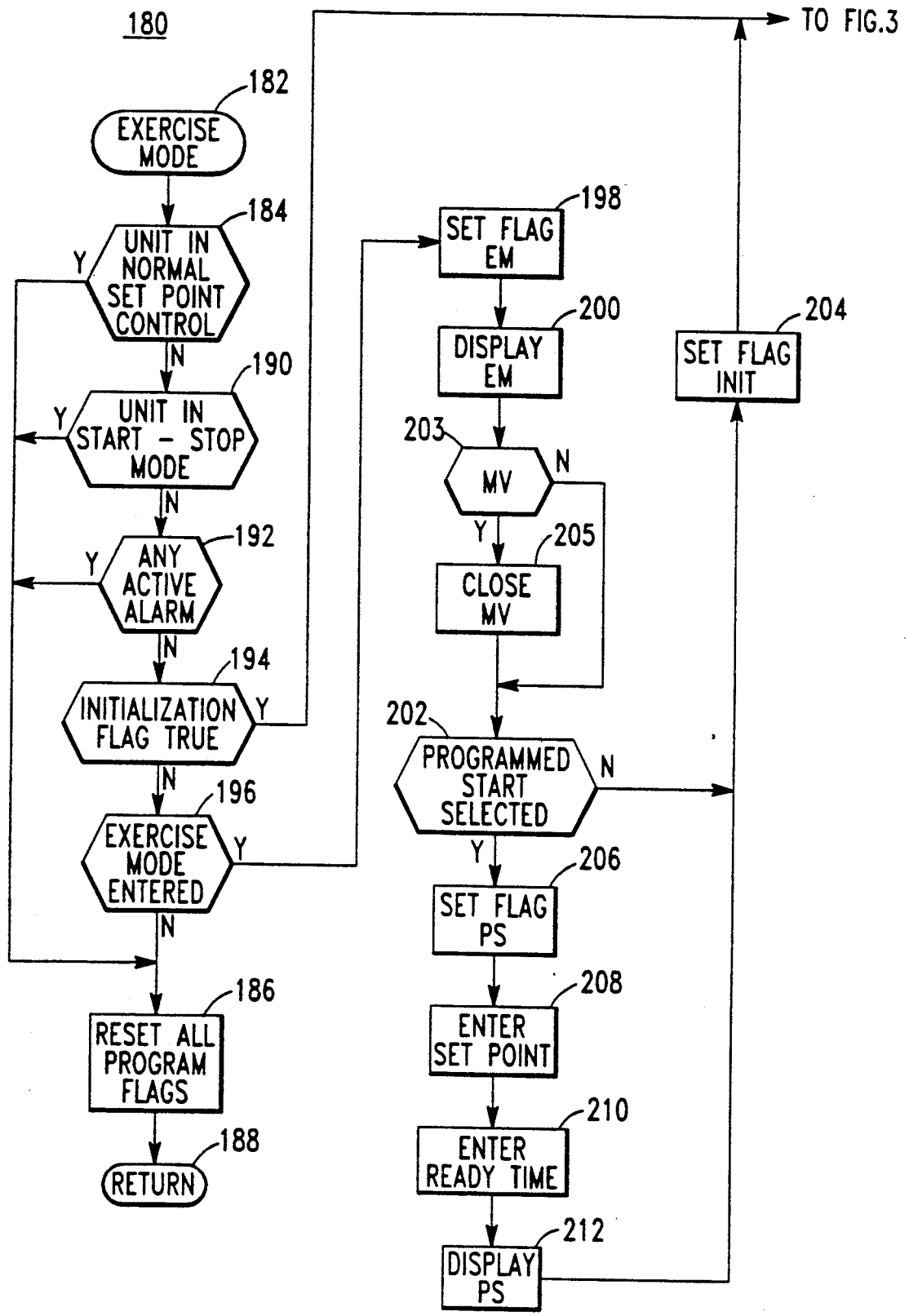
FIG. 2 is a flow diagram of a program setting forth the teachings of the invention relative to a control mode which maintains an engine illustrated in FIG. 1 in a ready-to-start condition, and for maintaining the temperature of a controlled space at a value related to the temperature of the ambient air.
Figure 3:
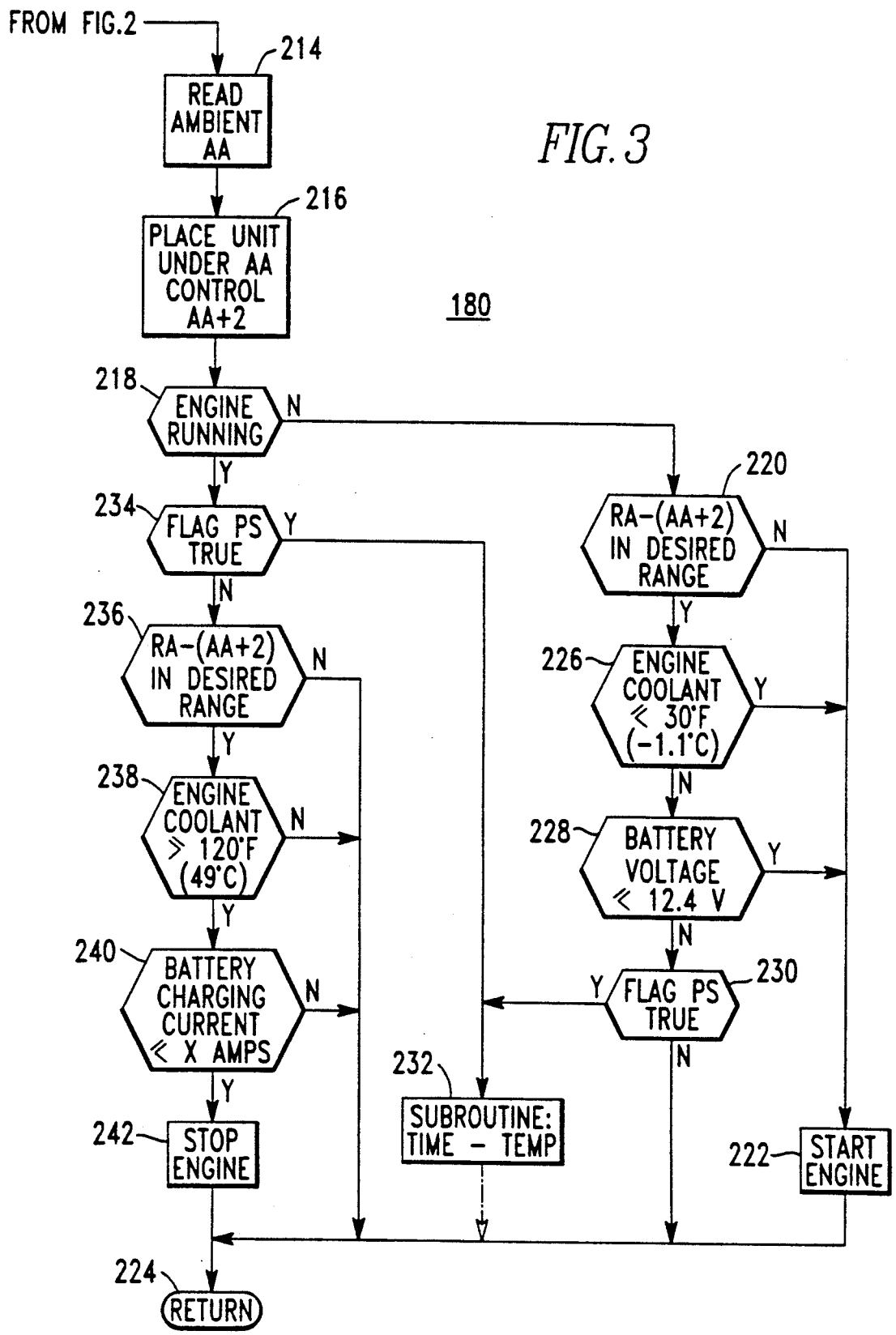
FIG. 3 is a flow diagram which is a continuation of the program initiated in FIG. 2.

FIGS. 2 and 3 are flow diagrams which may be combined to provide a program 180, stored in ROM 92, which operates refrigeration unit 10 according to the methods of the invention. Program 180 initiates an exercise or second control mode, which differs from the normal or first control mode in the way the temperature of conditioned space 48 is controlled, and also by providing an option of a programmed start. The programmed start feature automatically switches unit 10 from the second control mode to the first control mode so that conditioned space 48 will reach the selected set point temperature as close as possible to a programmed or selected starting time. In the normal or first control mode, refrigeration unit 10 is under normal set point control, controlling the temperature of conditioned space 48 to a temperature in a range or band immediately adjacent to the temperature selected by set point temperature selector 112, or entered via keypad input device 98.

Program 180 is entered periodically at 182 and step 184 determines if unit 10 is under normal set point control, i.e., is unit 10 currently operating in the normal or first control mode? Unit 10 will be considered to be in the normal or first control mode unless otherwise directed, such as by an appropriate input via keypad input device 98. When step 184 finds unit 10 under normal set point control, step 184 proceeds to step 186. Step 186 resets all program flags in RAM 94, it de-energizes any indicators on display 96 which are controlled by program 180, it terminates any current flow through modulation valve MV which resulted from program 180, and then program 180 exits at 188.

When step 184 finds that unit 10 has been taken out of the normal or first control mode, step 190 determines if unit 10 is set for continuous operation of the operative prime mover, or for a cycling start-stop mode of operation, by checking the position of selector switch 157. If unit 10 is not set for a cycling start-stop mode, at least the engine exercise feature of the invention is not feasible, and step 190 proceeds to steps 186 and 188.

When step 190 finds that the start-stop cycling mode has been selected by switch 157, step 190 proceeds to step 192 which determines if there is an active alarm condition associated with the operation of refrigeration unit 10. U.S. Pat. No. 5,123,253, for example, which is assigned to the same assignee as the present application, describes various alarm conditions which may be logged and indicated on display 96. If step 192 finds an active alarm condition, unit 10 will not be placed in the exercise or second operating mode, and step 192 proceeds to steps 186 and 188.

When step 192 finds no alarm condition, step 192 proceeds to step 194 which determines if this is an initial run through program 180, i.e., a run after all program flags have been reset in step 186. An initial run requires certain program steps to be performed which need not be repeated on subsequent runs. A flag INIT in RAM 94 is set by program 180 after these steps of the initial run have been completed. It will be assumed that this is an initial run, and thus flag INIT will not be true, and step 194 determines if the second or exercise control mode has been selected, such as via the keypad input device 98. If step 196 finds that the exercise mode has not been selected, step 196 proceeds to steps 186 and 188.

When step 196 finds the exercise mode has been selected, step 196 proceeds to step 198 which sets a flag EM in RAM 94, to signify the selection of the exercise mode, and step 200 may energize an indicator 201 on display 96, to alert operating personnel that unit 10 is in the second or exercise mode of operation.

Step 200 then proceeds to step 203 which determines if a modulation valve MV is in unit 10, by checking the logic level of input signal 179. If a modulation valve MV is provided, step 203 proceeds to step 205 which provides a predetermined current flow value through modulation valve MV, to reduce the size or area of the flow aperture, and thus reduce the load on engine 14. If step 203 finds no modulation valve MV, step 205 is by-passed.

The "no" branch from step 203, and step 205, both proceed to step 202 which determines if a second feature of the invention, called "programmed start" has been selected, such as via the keypad input device 98. The programmed start feature of the invention enables unit 10 to change from the second or exercise control mode to the first or normal set point control mode such that conditioned space 48 will reach a desired set point temperature at a predetermined time of a predetermined day. For example, unit 10 may be placed in the exercise mode on a Friday evening, to keep engine 14 in a ready-to-start condition, regardless of the weekend weather, and the programmed start feature will automatically switch the control from the second to the first control mode such that conditioned space 48 will reach a predetermined set point temperature at seven AM Monday morning, for example. This feature eliminates lost time when operating personnel arrive for work, and it eliminates the wasting of fuel, by calculating when operation of unit 10 should be changed from the second to the first control mode such that a pre-selected set point temperature will be reached as close as possible to the desired programmed "ready" time.

When step 202 finds that only the exercise mode has been selected, step 202 proceeds to step 204 which sets flag INIT in RAM 94 to indicate that program 180 has been initialized. When step 202 finds that the programmed start feature has been selected, step 206 sets a flag PS in RAM 94 to note that this feature has been activated, and step 208 requests that the desired set point temperature be entered, when the set point is entered via the keypad input device 98, instead of via the set point selector 112. Step 208 then proceeds to step 210 which directs the entry of the date and starting time at which it is desired that conditioned space 48 be at, or close to, the set point temperature entered in step 208. Step 212 then illuminates an indicator 213 on display 96 to indicate to operating personnel that the programmed start feature has been activated, and step 212 proceeds to step 202, to set flag INIT and indicate that program 180 has been initialized.

Step 194, when it finds flag INIT set, and step 204 which sets flag INIT, both proceed to step 214 FIG. 3. Step 214 reads and stores the temperature AA provided by signal 116 from the ambient air temperature sensor 122. Step 216 then places unit 216 under ambient air temperature control, overriding a set point temperature input in step 208, or by set point selector 112. Step 216 provides a new set point temperature by setting the set point temperature to which conditioned space 48 is to be maintained at a dynamic value which is directly proportional to the temperature AA of the ambient air 123 at any instant. For, example, as indicated in step 216, a constant, such as 2, may be added to the current temperature reading AA of the ambient air. Controlling the temperature of conditioned space 48 to a value close to the temperature outside conditioned space will result in little heat loss or gain to conditioned space, requiring minimal engine fuel. It is assumed that conditioned space 48 is either empty, or it contains a cargo which will not be harmed by the ambient temperature expected over the time that unit 10 will be in the second or exercise control mode.

Step 216 then proceeds to step 218 which determines if engine 14 is running. For example, controller 90 may check input signal 100 to determine the speed of engine; and/or an optional engine oil pressure input may be provided for controller 90 to check; or an engine starting program such as described in application Ser. No. 07/728,665, filed Jul. 11, 1991, may set an engine running flag ER in RAM 94 after a successful start of engine 14, which flag may be checked by step 218.

When step 218 finds that engine 14 is not running, step 220 determines if the temperature of the conditioned space 48 is within a predetermined temperature band adjacent to the dynamic set point AA+2. For example, as illustrated in FIG. 3, step 220 may subtract the dynamic set point AA+2 from the temperature RA of the return air 80, as provided by input signal 113 from return air temperature sensor 118. Step 220 then compares this difference value with an allowable deviation zone relative to the dynamic set point temperature. If the temperature of the conditioned space 48 is not within the desired range of the dynamic set point temperature step 220 proceeds to step 222 which starts engine 14, such as by using the engine starting program described in the hereinbefore mentioned application Ser. No. 07/728,665. Step 222 then exits program 180 at 224.

When step 220 finds that the temperature of conditioned space 48 is in the desired temperature range, step 220 proceeds to step 226 which determines if engine 14 should be started to maintain the temperature of engine 14 in a ready-to-start condition. For example, step 226 may determine if the temperature of engine coolant is equal to, or less than a predetermined value, such as 30° F. (−1.1° C.). The temperature of engine 14 is provided by temperature sensor 108 and signal 106. When step 226 finds that the temperature of engine 14 is equal to or less than the predetermined low value, step 226 proceeds to step 222 to start engine 14.

Upon finding that the temperature of engine 14 is satisfactory, step 226 may proceed to check other factors related to readiness of engine 14 to start, such as by proceeding to a step 228 which monitors the voltage level of battery 126 via conductor 168. Step 228 compares the battery voltage with a predetermined value, such as 12.4 volts. If the battery voltage is equal to, or less than, the predetermined value, step 228 proceeds to step 222 to start engine 14, as it indicates that battery 126 needs charging, to prevent the output voltage level of battery 126 from falling to a still lower value which may make starting of engine 14 questionable.

When steps 220, 226 and 228 find that engine 14 has no need to run to hold the dynamic set point temperature, or to maintain engine 14 in a ready-to-start condition, step 230 checks flag PS in RAM 94 to determine if the programmed start feature has been activated. If the programmed start feature has been selected step 230 proceeds to a subroutine shown in FIG. 4, to implement that feature, and when the programmed start feature has not been selected, step 230 proceeds to the program exit 224.

When step 218 finds engine 14 is running, step 236 proceeds to step 234. Step 234 is similar to step 230, checking flag PS in RAM 94 to determine if the programmed start feature has been activated. If it has been selected, step 234 proceeds to step 232 which calls the subroutine shown in FIG. 4 to implement this feature. When step 234 finds that flag PS is not true, step 234 proceeds to step 236 which, similar to step 220, determines if the temperature RA of conditioned space 48 is in the desired zone adjacent to the dynamic set point temperature AA+2. If the temperature RA of conditioned space 48 is not within the desired temperature zone adjacent to the dynamic set point temperature AA+2, engine 14 is not ready to be shut down, and step 236 proceeds to the program exit 224.

When step 236 finds the temperature RA of conditioned space to be satisfied, step 236 proceeds to step 238 to determine if engine 14 should be maintained in a running condition for reasons related to the ability of engine 14 to restart. For example, step 238 may determine if the temperature of engine 14 is equal to, or above, a predetermined upper reference value, such as 120° F. (49° C.). If the temperature of engine 14 is not equal to, or above, this upper reference value, engine 14 is not ready for shut down, and step 238 proceeds to program exit 224.

When step 238 finds the temperature of engine 14 is high enough for shut down, other items related to the ability of engine to restart may be checked. For example, step 240 may check the charging current level provided by conductors 168 and 170, to determine if the charging current has dropped to, or below, a predetermined value "X". If the charging current has not dropped to this value, the engine is not shut down, as battery 126 requires additional charging, and step 240 proceeds to program exit 224.

When steps 236, 238 and 240 find that the temperature of conditioned space 48 is satisfied, and that engine 14 is in a ready-to-start condition, step 240 proceeds to step 242 which shuts engine 14 down by de-energizing relay RUN, which opens its contact 138 to de-energize the fuel solenoid FS.

Figure 4:
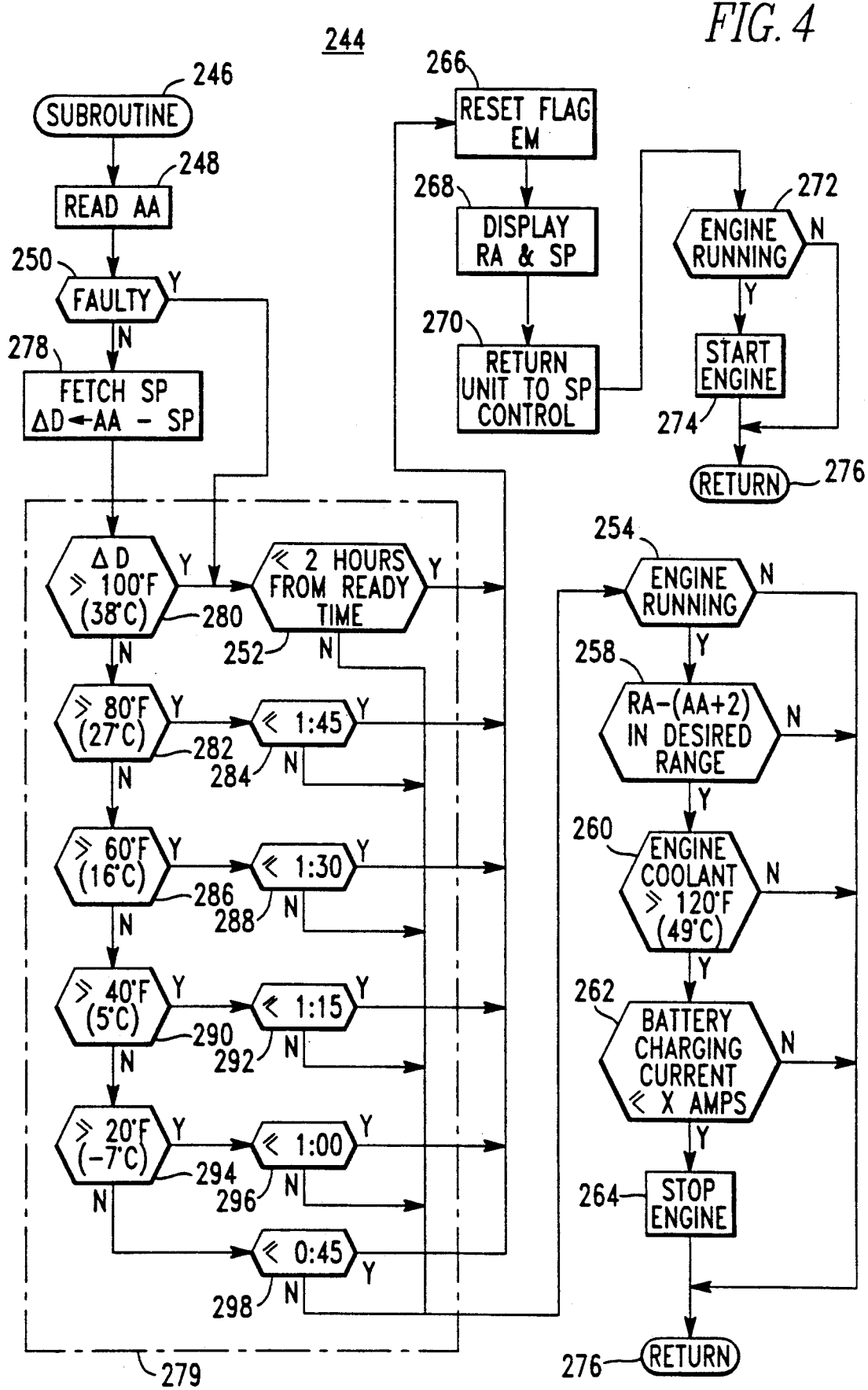
FIG. 4 is a flow diagram of a subroutine called by the program of FIGS. 2 and 3 to implement a programmed start feature of the invention.

When step 230, or step 234, find that the programmed start feature has been selected, they both call a subroutine shown in FIG. 4. FIG. 4 is a flow chart of a program 244 which determines when refrigeration unit 10 should be switched from the exercise or second control mode, during which the conditioned space is controlled to a temperature which is a direct function of the ambient temperature AA, to the first control mode during which conditioned space 48 is controlled to a selected set point temperature SP, i.e., the value entered in step 208, or the value set on set point selector 110. Program 244 determines when the change in control modes should be made such that the temperature of conditioned space 48 will reach the selected set point temperature as close as possible to the selected time of the selected day, thus conserving engine fuel.

More specifically, program 244 is entered at 246 and step 248 reads and stores the current temperature reading AA of the ambient air 123, similar to step 214. Step 250 determines if the temperature value AA provided by ambient temperature sensor 122 is in a plausible range. If step 250 finds that ambient temperature sensor 122 is faulty, then control is switched from the second control mode to the first control mode at a predetermined maximum default value, such as two hours prior to the programmed "ready" time. This determination is performed in step 252, which determines if the present date is the programmed starting date entered in step 210, and if so, does the real time clock RTC indicate that real time is equal to, or less than, two hours from the programmed starting time entered in step 210? If the starting day has not been reached, or the starting day has been reached but real time is greater than two hours before the programmed starting time, step 252 proceeds to step 254 which, similar to step 218, determines if engine 14 is running. If engine 254 is not running, it has no need to run because of the programmed start feature, and program 244 returns to the main program at 256.

When step 254 finds engine 14 running steps 258, 260, and 262 determine if engine 14 may be stopped, and if so, step 264 stops engine 14. If engine 14 needs to run, as determined by any one of steps 258, 260 and 262, then these steps by-pass step 264, exiting program 244 at 256. Steps 258, 260, 262 and 264 are the same as the hereinbefore described steps 236, 238, 240 and 242, respectively, and thus need not be described in detail.

When step 252 determines that real time is within two hours of the programmed ready time, step 252 proceeds to step 266 which resets flag EM in RAM 94, to indicate that unit 10 is no longer in the second or exercise control mode, step 268 displays the temperature RA of the return air and the selected set point temperature SP, such as at a location 269 on display 96, and step 270 returns unit 10 to the first or normal control mode which controls the temperature of conditioned space to the selected set point temperature SP. Step 272 determines if engine 14 is running, and if engine 14 is not running step 274 starts it, as refrigeration unit 10 will now start to control to a different set point temperature. Step 274 proceeds to program exit 276. When step 272 finds that engine 14 is already running, step 272 proceeds to exit 276.

When step 250 finds ambient air temperature sensor 122 is not faulty, step 250 proceeds to step 278 which fetches the set point temperature SP entered in step 208, or the value selected on set point selector 112, and then calculates a difference value ΔD equal to the current reading of the ambient air temperature AA and the selected set point temperature SP. Step 278 then proceeds to a portion 279 of program 244 which functions as a look-up table, using ΔD to select a minimum time value for comparison with the real time remaining before the programmed "ready" time at which the conditioned space 48 is to be at the selected set point temperature SP.

More specifically, after step 278 calculates the difference value ΔD, which as stated, is equal to the difference between the temperature AA of the ambient air 123 and the selected set point temperature SP, i.e., AA -SP, step 280 compares ΔD with a first reference value, such as 100° F. (38° C.). If ΔD is equal to, or greater than, the first reference value, step 280 proceeds to the hereinbefore described step 252. As stated, step 252 determines if the starting date has been reached, and when the starting date has been reached, if real time is within two hours of the programmed "ready" time.

When step 280 finds that ΔD is not equal to, or greater than, 100° F., a plurality of progressively smaller reference values are compared with ΔD until ΔD is placed in a predetermined specific range. Each progressively lower range is compared with a progressively smaller time value, as the smaller the difference value ΔD, the less time it will take for unit 10 to bring conditioned space 48 from the dynamic set point value AA+2, to the selected set point temperature SP. For example, step 280 may proceed to a step 282 which determines if ΔD is between 80° F. (27° C.) and 100° F. (38° C.). If so, step 284 determines if real time is equal to, or less than, 1:45 hours from the programmed "ready" time. If so, step 284 proceeds to the hereinbefore described step 266, to initiate the change from the second control mode to the first control mode. If real time is not within 1:45 hours from the programmed "ready" time, step 284 proceeds to the hereinbefore described step 254.

If ΔD is less than 80° F. (27° C.), step 286 determines if ΔD is equal to, or greater than, 60° F. (16° C.). If so, step 288 determines if real time is within 1:30 hours from the programmed "ready" time, proceeding to step 266 when it is, and to step 254 when it is not.

If ΔD is less than 60° F. (16° C.), step 290 determines if ΔD is equal to, or greater than, 40° F. (5° C.). If so, step 292 determines if real time is within 1:15 hours from the programmed "ready" time, proceeding to step 266 when it is, and to step 254 when it is not.

If ΔD is less than 40° F. (5° C.), step 294 determines if ΔD is equal to, or greater than, 20° F. (−7° C.). If so, step 296 determines if real time is within 1:00 hours from the programmed "ready" time, proceeding to step 266 when it is, and to step 254 when it is not.

If ΔD is less than 20° F. (−7° C.), step 294 proceeds to step 298 which determines if real time is within 0:45 hours from the programmed "ready" time, proceeding to step 266 when it is, and to step 254 when it is not.

While program 180 shown in FIG. 2 only enables the programmed start mode aspect of the invention to be used when the exercise mode aspect of the invention has been selected, it is to be understood that the programmed start mode feature may be selected independently from the exercise mode feature, if desired. For example, when engine 14 has been selected as the prime mover, but step 190 finds that the continuous mode has been selected, the engine exercise mode is not relevant but it may still be desirable to enter step 202 to determine if the programmed start feature has been selected. Also, when motor 16 has been selected by switch 157 as the prime mover, the engine exercise mode is not relevant, but it may still be desirable to energize motor 16 at a variable time prior to a programmed "ready" time, to conserve electrical energy, with the variable time being a function of the temperature RA of the conditioned space 48 and the selected set point temperature SP, as hereinbefore described.

We claim:

1. A method of operating a refrigeration system having a compressor driven by an internal combustion engine, with the refrigeration system being selectively operable in a first control mode to hold the temperature of a conditioned space in a predetermined temperature range adjacent to a selected set point temperature, and in a second control mode, with the second control mode comprising the steps of:

starting and stopping the engine in response to a predetermined condition related to maintaining the engine in a ready-to-start condition, monitoring the ambient temperature, determining a dynamic set point temperature to which the temperature of the conditioned space is to be maintained, said step of determining said dynamic set point temperature including the step of selecting the dynamic set point temperature as a direct function of ambient temperature, and starting and stopping the engine as a function of the dynamic set point temperature, whereby the temperature of the conditioned space is maintained in a predetermined temperature range adjacent to the dynamic set point temperature, and the engine is maintained in a ready-to-start condition.

2. The method of claim 1 wherein the engine includes an engine coolant, and the steps of starting and stopping the engine in response to a predetermined condition related to maintaining the engine in a ready-to-start condition includes the steps of:

monitoring the temperature of the engine coolant, starting the engine as a function of the temperature of the engine coolant relative to a first reference value, and stopping the engine as a function of the temperature of the engine coolant relative to a second reference value, to hold the temperature of the engine coolant between the first and second reference values.

3. The method of claim 1 wherein the refrigeration system includes a suction line modulation valve having a controllable aperture size, and including the step of:

reducing the aperture size of the suction line modulation valve during the second control mode, to reduce the load on the engine and conserve fuel.

4. The method of claim 1 wherein the step of determining the dynamic set point temperature includes the steps of:

providing a predetermined constant, and adding said predetermined constant to the ambient temperature, with the resulting sum being the dynamic set point temperature.

5. The method of claim 1 wherein the refrigeration system includes a battery for starting the engine, and the step of starting and stopping the engine in response to a predetermined condition related to maintaining the engine in a ready-to-start condition includes the steps of:

monitoring the battery voltage while the engine is stopped, and starting the engine as a function of the battery voltage.

6. The method of claim 5 wherein the step of starting the engine as a function of battery voltage includes the steps of:

providing a predetermined reference value, comparing the monitored battery voltage with said predetermined reference value, and starting the engine when the battery voltage is less than said predetermined reference value.

7. The method of claim 1 wherein the refrigeration system includes a battery for starting the engine, and means for charging the battery while the engine is running, and the steps of starting and stopping the engine in response to a predetermined condition related to maintaining the engine in a ready-to-start condition includes the steps of:

monitoring the battery charging current while the engine is operating, and preventing stopping of the engine by the stopping step as a function of the battery charging current.

8. The method of claim 7 wherein the step of preventing stopping the engine as a function of the battery charging current includes the steps of:

providing a predetermined reference value, comparing the monitored battery charging current with said predetermined reference value, and preventing stopping of the engine when the battery charging current exceeds said predetermined reference value.

9. The method of claim 1 wherein the second control mode further includes the steps of:

providing a selectable programmed start mode wherein the conditioned space is to be at a selected set point temperature at a selected time of a selected day, determining a dynamic period of time required to bring the temperature of the conditioned space to the selected set point temperature at the selected time of day as a function of the difference between the ambient temperature and the selected set point temperature, and changing from the second control mode to the first control mode prior to the selected time of day as a function of the determined dynamic period of time.

10. The method of claim 9 wherein the step of determining said dynamic period of time includes the steps of:

comparing periodically the temperature of the ambient air with the selected set point temperature to provide a temperature difference value, providing a plurality of minimum advanced starting times for a plurality of predetermined ranges of difference values, selecting a minimum advanced starting time in response to each periodically provided temperature difference value, monitoring real time, comparing real time with the selected time of day to determine the time remaining, and comparing the time remaining with the current selection of the minimum advanced starting time, wherein the determined dynamic time is the time remaining, when the time remaining is equal to or less than the current selection of the minimum advanced starting time.

* * * * *